US010044284B2

(12) United States Patent
Wang et al.

(10) Patent No.: US 10,044,284 B2
(45) Date of Patent: Aug. 7, 2018

(54) SYNCHRONOUS RECTIFIER DRIVING METHOD, SYNCHRONOUS RECTIFIER CIRCUIT AND SWITCHING POWER SUPPLY

(71) Applicant: ZTE CORPORATION, Shenzhen, Guangdong Province (CN)

(72) Inventors: Qia Wang, Shenzhen (CN); Jie Fan, Shenzhen (CN); Hongjin Liu, Shenzhen (CN); Guoxian Lin, Shenzhen (CN); Fengfu Du, Shenzhen (CN); Xiufeng Dong, Shenzhen (CN); Jianping Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/578,255

(22) PCT Filed: Oct. 26, 2015

(86) PCT No.: PCT/CN2015/092851
§ 371 (c)(1),
(2) Date: Nov. 30, 2017

(87) PCT Pub. No.: WO2016/192281
PCT Pub. Date: Dec. 8, 2016

(65) Prior Publication Data
US 2018/0159436 A1    Jun. 7, 2018

(30) Foreign Application Priority Data
Jun. 1, 2015 (CN) .......................... 2015 1 0293512

(51) Int. Cl.
*H02M 7/219*    (2006.01)
*H02M 3/335*    (2006.01)
(Continued)

(52) U.S. Cl.
CPC ....... *H02M 3/33592* (2013.01); *H02M 1/088* (2013.01); *H02M 1/32* (2013.01);
(Continued)

(58) Field of Classification Search
CPC ......... H02M 2007/2195; H02M 7/219; H02M 2001/0009
See application file for complete search history.

(56) References Cited

U.S. PATENT DOCUMENTS

| 2014/0119063 A1* | 5/2014 | Tseng | H02M 1/36 363/21.05 |
| 2014/0217947 A1* | 8/2014 | Haugan | H02M 7/219 318/503 |
| 2015/0036397 A1* | 2/2015 | Wang | H02M 1/32 363/55 |

FOREIGN PATENT DOCUMENTS

| CN | 102195492 A | 9/2011 |
| CN | 202713159 U | 1/2013 |
| CN | 103475195 A | 12/2013 |

* cited by examiner

*Primary Examiner* — Timothy J Dole
*Assistant Examiner* — Ishrat Jamali
(74) *Attorney, Agent, or Firm* — Ling Wu; Stephen Yang; Ling and Yang Intellectual Property (57) ABSTRACT

A synchronous rectifier driving method, a synchronous rectifier circuit and a switching power supply are provided, and the method includes: detecting an output current in a secondary winding of a transformer unit, and generating a first driving signal according to the output current; obtaining a protection signal according to a voltage signal of the secondary winding of the transformer unit in a synchronous rectifier circuit; correcting the first driving signal by using the obtained protection signal to obtain a second driving signal; and driving a rectifier in the synchronous rectifier circuit according to the second driving signal.

9 Claims, 7 Drawing Sheets

(51) Int. Cl.
*H02M 1/32* (2007.01)
*H02M 1/088* (2006.01)
*H02M 1/00* (2006.01)

(52) U.S. Cl.
CPC .... *H02M 7/219* (2013.01); *H02M 2001/0009* (2013.01); *H02M 2007/2195* (2013.01)

SYNCHRONOUS RECTIFIER DRIVING METHOD, SYNCHRONOUS RECTIFIER CIRCUIT AND SWITCHING POWER SUPPLY

TECHNICAL FIELD

Embodiments of the present disclosure relate to, but is not limited to, a switching power supply field, in particular to a synchronous rectifier driving method, a synchronous rectifier circuit and a switching power supply.

BACKGROUND

In order to meet the requirement of a communication power supply for high power density and high efficiency, synchronous rectification technology is widely used in DC-DC power converters. However, since a rectifier diode will generate a considerable conduction loss, a rectification circuit composed of transistors replaces a circuit composed of rectifier diodes. Compared with the circuit using rectifier diodes, the circuit using transistors for rectification has lower circuit loss and high efficiency, and meanwhile has higher requirement for reliability of transistor control. Therefore it is needed to eliminate interference due to a driver, misoperation and other abnormalities, these abnormalities will cause conductivity of upper and lower switching tubes in the same bridge arm of a synchronous rectifier circuit, resulting in the damage to the switching tube. A synchronous rectification control method commonly used in the related art generally includes: detecting the output current in a secondary winding of the transformer unit, and generating a first driving signal according to the output current, and then driving the on-and-off of a rectifier in the synchronous rectifier circuit by using the first driving signal.

A current sampling device is used to detect the output current (i.e., the current flowing through the parasitic diode of the synchronous rectifier) in the secondary winding of the transformer unit and turns on the synchronous rectifier when detecting that there is a current flowing through. However, a current detecting circuit has parasitic parameters, the signal of the output current is easily delayed, easily causing delays of turn-on and turn-off signals. Meanwhile, when the first driving signal is converted from the signal of the output current, there also exists a delay and there are also interference signals because it is easily affected by a power circuit. When amplitudes of these interference signals exceed the base drive voltage threshold of the synchronous rectifier, the synchronous rectifier will be mis-opened, and further the synchronous rectifier is directly conducted to cause the damage to the synchronous rectifier.

SUMMARY

What is described below is a summary of the subject matter described in detail in this text. This summary is not intended to limit the protection scope of claims.

Embodiments of the present disclosure provide a synchronous rectifier driving method, a synchronous rectifier circuit and a switching power supply and can accurately control on-and-off of a synchronous rectifier.

An embodiment of the present disclosure provides a synchronous rectifier driving method, used for driving a rectifier in a synchronous rectifier circuit. The synchronous rectifier driving method includes: detecting an output current in a secondary winding of a transformer unit, and generating a first driving signal according to the output current; the method includes:

obtaining a protection signal according to a voltage signal of the secondary winding of the transformer unit in the synchronous rectifier circuit;

correcting the first driving signal by using the obtained protection signal to obtain a second driving signal; and driving the rectifier in the synchronous rectifier circuit according to the second driving signal.

In an exemplary embodiment, said obtaining a protection signal according to a voltage signal of the secondary winding of the transformer unit includes:

detecting a first voltage and a second voltage at two ends of the secondary winding of the transformer unit and obtaining the protection signal according to a comparison result of the first voltage and the second voltage.

In an exemplary embodiment, the protection signal includes a first voltage signal inputA and a second voltage signal inputB, Said obtaining the protection signal according to a comparison result of the first voltage and the second voltage includes: when the first voltage VA is greater than the second voltage VB, the first voltage signal inputA is a high-level signal and the second voltage signal inputB is a low-level signal; when the first voltage VA is less than the second voltage VB, the first voltage signal inputA is a low-level signal and the second voltage signal inputB is a high-level signal.

In an exemplary embodiment, said correcting the first driving signal by using the obtained protection signal to obtain a second driving signal includes:

carrying out an AND operation on the first driving signal and the protection signal, using a result of the AND operation as the second driving signal.

An embodiment of the present disclosure further provides a synchronous rectifier circuit, including: a transformer unit, a current sampling unit, a first signal processing unit, a driving unit and a synchronous rectifier unit, the current sampling unit is configured to detect an output current in a secondary winding of the transformer unit; the first signal processing unit is configured to generate a first driving signal according to the output current in the secondary winding of the transformer unit; and the synchronous rectifier circuit further includes a protection unit and a second signal processing unit.

The protection unit is configured to obtain a protection signal according to a voltage signal of the secondary winding of the transformer unit in the synchronous rectifier circuit.

The second signal processing unit is configured to correct the first driving signal by using the obtained protection signal to obtain a second driving signal.

The driving unit is configured to drive a rectifier in the synchronous rectifier circuit according to the second driving signal.

In an exemplary embodiment, the transformer unit includes one or more transformers and each transformer includes one or more secondary windings; the current sampling unit includes a first instrument transformer and a rectification circuit. A primary side of the first instrument transformer is connected in series to a first secondary winding which is one of secondary windings corresponding to any transformer; a secondary side of the first instrument transformer is connected to the rectification circuit; the rectification circuit generates a first voltage signal $VR_{left}$ and a second voltage signal $VR_{right}$ according to a current signal output by the first instrument transformer.

In an exemplary embodiment, the first signal processing unit includes a first comparison circuit, and the first driving signal includes a third voltage signal $V_{left}$ and a fourth voltage signal $V_{right}$. A reference voltage $V_{ref1}$ is set in the first comparison circuit and the first comparison circuit obtains the third voltage signal $V_{left}$ by comparing the first voltage signal $VR_{left}$ with the reference voltage $V_{ref1}$ and obtains the fourth voltage signal $V_{right}$ by comparing the second voltage signal $VR_{right}$ with the reference voltage $V_{ref1}$, the third voltage signal $V_{left}$ and the fourth voltage signal $V_{right}$ are both square signals.

In an exemplary embodiment, the protection unit includes a voltage detecting circuit and a second comparison circuit, the protection signal includes a fifth voltage signal inputA and a sixth voltage signal inputB. Input ends of the voltage detecting circuit are respectively connected to two ends of a second secondary winding, and detected seventh voltage signal $V_A$ and eighth voltage signal $V_B$ are provided to the second comparison circuit, the second secondary winding is one of secondary windings corresponding to any transformer. The second comparison circuit compares the seventh voltage signal $V_A$ and the eighth voltage signal $V_B$ according to the detected seventh voltage signal $V_A$ and eighth voltage signal $V_B$ to obtain the fifth voltage signal inputA and the sixth voltage signal inputB.

In an exemplary embodiment, the protection signal includes the fifth voltage signal inputA and the sixth voltage signal inputB. The second comparison circuit is configured as that: when the seventh voltage signal $V_A$ is greater than the eighth voltage signal $V_B$, the output fifth voltage signal inputA is a high-level signal and the output sixth voltage signal inputB is a low-level signal; when the seventh voltage signal $V_A$ is less than the eighth voltage signal $V_B$, the output fifth voltage signal inputA is a low-level signal and the output sixth voltage signal inputB is a high-level signal.

In an exemplary embodiment, the second signal processing unit is configured to carry out an AND operation on the first driving signal and the protection signal, use a result of the AND operation as the second driving signal; the second driving signal includes a first driving signal outputA and a second driving signal outputB. An AND operation is carried out on the third voltage signal $V_{left}$ and the fifth voltage signal inputA to obtain the first driving signal outputA; an AND operation is carried out on the fourth voltage signal $V_{right}$ and the sixth voltage signal inputB to obtain the second driving signal outputB.

An embodiment of the present disclosure further provides a switching power supply, including any of the above mentioned synchronous rectifier circuits.

Compared with the related art, the solution provided in the embodiments of the present disclosure includes: obtaining a protection signal according to a voltage signal of a secondary winding of a transformer unit in the synchronous rectifier circuit, wherein a synchronous reversal occurs in the protection signal according to a level reversal of a primary winding of the transformer unit; correcting the first driving signal by using the obtained protection signal to obtain a second driving signal; and driving a rectifier in the synchronous rectifier circuit according to the second driving signal. In the related art, turning-on and turning-off of the synchronous rectifier are controlled only through the first driving signal. In the embodiments of the present disclosure, since the synchronous reversal can occur in the protection signal can synchronously according to the level reversal of the primary winding of the transformer unit, the second driving signal is obtained by correcting the first driving signal by using the protection signal, the high level of the first driving signal is eliminated in a delay region, thus eliminating the delay phenomenon of level reversal in the first driving signal, avoiding a misoperation of turning on the synchronous rectifier, thereby reducing damage to the synchronous rectifier, improving the performance of the synchronous rectifier circuit, and improving the performance of the switching power supply including the synchronous rectifier circuit.

Other aspects will become apparent upon reading and understanding the drawings and detailed description.

DETAILED DESCRIPTION

Embodiments of the present disclosure will be described below in further detail with reference to the accompanying drawings. It should be noted that, in the case of no conflict, embodiments in this application and various modes in the embodiments may be combined with each other.

Embodiment 1

Figure 1:
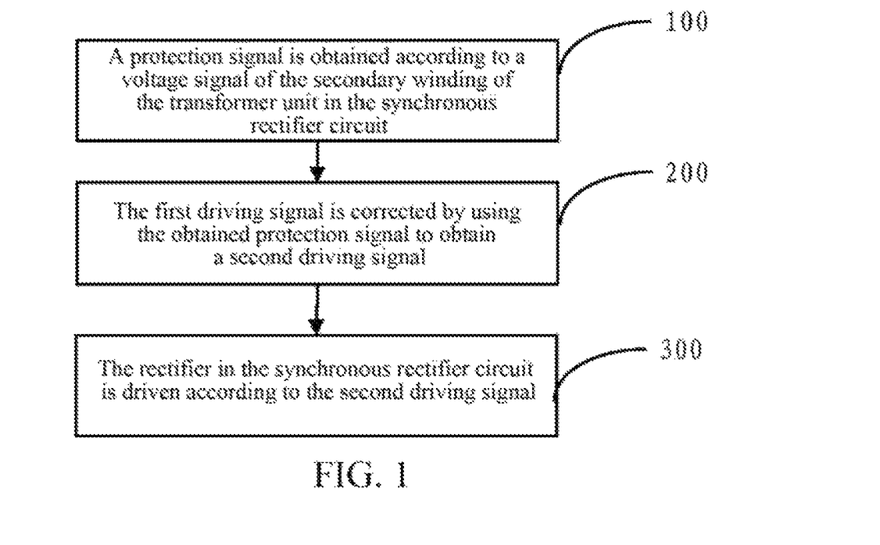
FIG. 1 is a schematic flow chart of a synchronous rectifier driving method provided in embodiment 1 of the present disclosure.

Referring to FIG. 1, an embodiment of the present disclosure provides a synchronous rectifier driving method, used for driving a rectifier in a synchronous rectifier circuit. The synchronous rectifier circuit includes a transformer unit, and the synchronous rectifier driving method includes: detecting an output current in a secondary winding of a transformer unit, and generating a first driving signal according to the output current; the method includes steps 100, 200, 300.

In Step 100, a protection signal is obtained according to a voltage signal of a secondary winding of the transformer unit; herein a synchronous reversal occurs in the protection signal according to a level reversal in a primary winding of the transformer unit.

Herein, obtaining a protection signal according to a voltage signal of the secondary winding of the transformer unit includes: detecting a first voltage and a second voltage at two ends of the secondary winding of the transformer unit and obtaining the protection signal according to a comparison result of the first voltage and the second voltage.

Herein, obtaining the protection signal according to the comparison result of the first voltage and the second voltage includes: the protection signal includes a voltage signal inputA and a voltage signal inputB; when the first voltage VA is greater than the second voltage VB, the voltage signal inputA is a high-level signal and the voltage signal inputB is a low-level signal; when the first voltage VA is less than the second voltage VB, the voltage signal inputA is a low-level signal and the voltage signal inputB is a high-level signal.

In Step 200, the second driving signal is obtained according to the first driving signal and the protection signal (the first driving signal is corrected by using the obtained protection signal) includes: carrying out an AND operation on the first driving signal and the protection signal, using a result of the AND operation as the second driving signal.

In Step 300, the rectifier in the synchronous rectifier circuit is driven according to the second driving signal.

Embodiment 2

Figure 2:
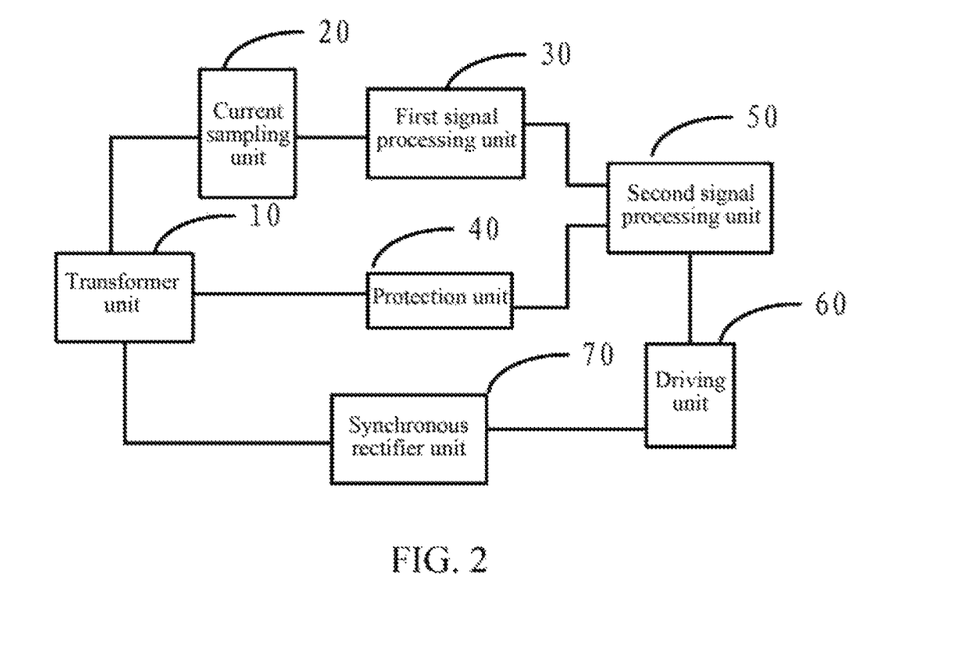
FIG. 2 is a block diagram of a synchronous rectifier circuit provided in embodiment 2 of the present disclosure.

Based on a concept same as or similar to that in the foregoing embodiment, an embodiment of the present disclosure further provides a synchronous rectifier circuit. FIG. 2 is a block diagram of the synchronous rectifier circuit provided in an embodiment of the present disclosure. As shown in FIG. 2, the synchronous rectifier circuit provided in the embodiment of the present disclosure includes: a transformer unit 10, a current sampling unit 20, a first signal processing unit 30, a protection unit 40, a second signal processing unit 50, a driving unit 60, and a synchronous rectifier unit 70.

The current sampling unit 20 is configured to detect an output current in a secondary winding of the transformer unit 10.

The first signal processing unit is configured to generate a first driving signal according to the output current in the secondary winding of the transformer unit 10.

The protection unit 40 is configured to obtain a protection signal according to a voltage signal of the secondary winding of the transformer unit in the synchronous rectifier circuit.

The second signal processing unit 50 is configured to correct the first driving signal by using the obtained protection signal to obtain a second driving signal.

The driving unit 60 is configured to drive a rectifier in the synchronous rectifier circuit according to the second driving signal.

Herein a synchronous reversal occurs in the protection signal according to the level reversal in a primary winding of the transformer unit 10.

Herein the synchronous rectifier in the synchronous rectifier unit 70 is connected to the secondary winding of the transformer unit 10.

In the embodiment of the present disclosure, the transformer unit 10 includes one or more transformers and each transformer includes one or more secondary windings; the current sampling unit 20 includes a first instrument transformer and a rectification circuit.

The primary side of the first instrument transformer is connected in series to a first secondary winding which is one of secondary windings corresponding to any transformer; the secondary side of the first instrument transformer is connected to the rectification circuit; the rectification circuit generates voltage signals $V_{left}$ and $VR_{right}$ according to a current signal output by the first instrument transformer.

In an embodiment of the present disclosure, the first signal processing unit 30 includes a first comparison circuit, and the first driving signal includes voltage signals $V_{left}$ and $V_{right}$.

A reference voltage $V_{ref1}$ is set in the first comparison circuit and the first comparison circuit obtains the voltage signal $V_{left}$ by comparing the voltage signal $VR_{left}$ with the reference voltage $V_{ref1}$ and obtains the voltage signal $V_{right}$ through comparing the voltage signal $VR_{right}$ with the reference voltage $V_{ref1}$, herein the voltage signals $V_{left}$ and $V_{right}$ are both square signals.

In an embodiment of the present disclosure, the protection unit 40 includes a voltage detecting circuit and a second comparison circuit, the protection signal includes voltage signals inputA and inputB.

Input ends of the voltage detecting circuit are respectively connected to two ends of a second secondary winding, and detected voltage signals $V_A$ and $V_B$ are provided to the second comparison circuit, herein the second secondary winding is one of secondary windings corresponding to any transformer.

The second comparison circuit compares the voltage signals $V_A$ and $V_B$ according to the detected voltage signals $V_A$ and $V_B$ to obtain the voltage signals inputA and inputB. The second comparison circuit is configured as that: when the voltage signal $V_A$ (the first voltage VA in the foregoing method) is greater than the voltage signal $V_B$ (the second voltage VB in the foregoing method), the output voltage signal inputA is a high-level signal and the output voltage signal inputB is a low-level signal; when the voltage signal $V_A$ is less than the voltage signal $V_B$, the output voltage signal inputA is a low-level signal and the output voltage signal inputB is a high-level signal.

In an embodiment of the present disclosure, the second signal processing unit is configured to carry out an AND operation on the first driving signal and the protection signal, use the result of the AND operation as the second driving signal; the second driving signal includes a driving signal outputA and a driving signal outputB.

An AND operation is carried out on the voltage signal $V_{left}$ and the voltage signal inputA to obtain the driving signal outputA; an AND operation is carried out on the voltage signal $V_{right}$ and the voltage signal inputB to obtain the driving signal outputB.

The following description is set forth with reference to application scenarios.

APPLICATION EXAMPLE 1

Figure 3A:
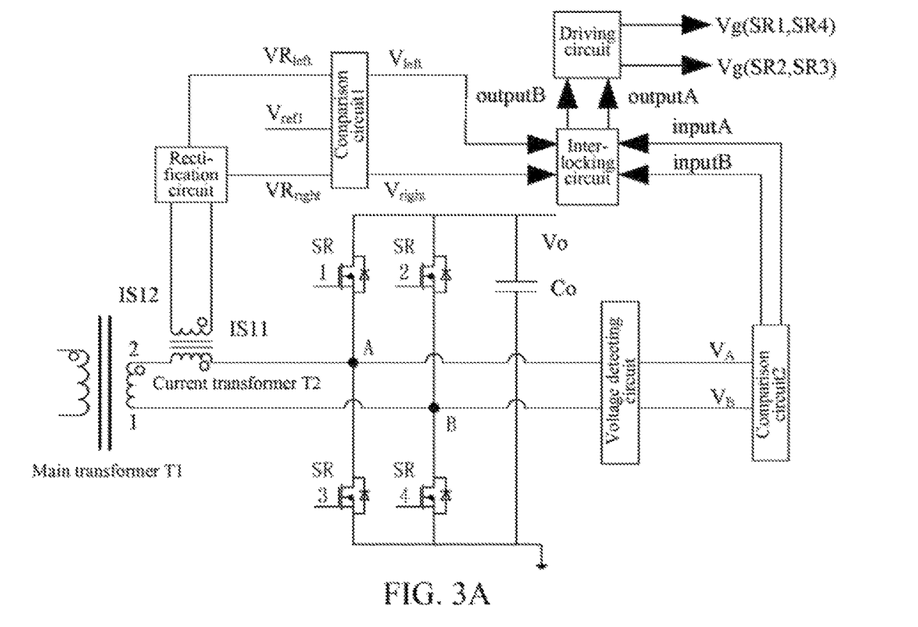
FIG. 3A, FIG. 3B, FIG. 3C, FIG. 3D, FIG. 3E and FIG. 3F are respectively circuit structure diagrams of the synchronous rectifier circuit provided in application examples of the present disclosure.

Referring to FIG. 3A, based on the synchronous rectifier circuit provided in the foregoing embodiment, this example provides a synchronous rectifier circuit. As shown in FIG. 3A, in the synchronous rectifier circuit, the transformer unit 10 includes a transformer T1; the transformer T1 includes a secondary winding, the synchronous rectifier unit 70 includes four rectifiers which respectively are rectifiers SR1, SR2, SR3 and SR4, where SR1 and SR3 are on the same bridge arm and SR2 and SR4 are on the same bridge arm.

The current sampling unit 20 includes a first instrument transformer (the current transformer T2 in this example) and a rectification circuit; a primary side of the current transformer T2 is connected in series to a secondary winding of the transformer T1, and a secondary side of the current transformer T2 is connected to the rectification circuit. The current transformer T2 is connected in series with the secondary winding of the transformer T1 and then connected to a source electrode of the full-bridge synchronous rectifier SR1; a current detected by the primary side of the current transformer T2 is an alternating current signal, and two ends of the secondary side of the current transformer T2 are connected with the rectification circuit. The rectification circuit generates voltage signals $VR_{left}$ and $VR_{right}$ according to a current signal output by the first instrument transformer T2.

A reference voltage $V_{ref1}$ is set in the first comparison circuit (the comparison circuit 1 in this example) and the first comparison circuit obtains the voltage signal $V_{left}$ by comparing the voltage signal $VR_{left}$ with the reference voltage $V_{ref1}$ and obtains the voltage signal $V_{right}$ by comparing the voltage signal $VR_{right}$ with the reference voltage $V_{ref1}$. The voltage signals $V_{left}$ and $V_{right}$ are both square signals.

The protection unit 40 includes a voltage detecting circuit and a second comparison circuit (the comparison circuit 2 in this example), the protection signal includes voltage signals inputA and inputB. Input ends of the voltage detecting circuit are respectively connected to two ends of the second secondary winding. Herein the voltage detecting circuit respectively detects a voltage to earth of a source electrode point A of the synchronous rectifier SR1 and a voltage to earth of a drain electrode point B of the synchronous rectifier SR4 to obtain voltage signals $V_A$ and $V_B$, the voltage detecting circuit provides the detected voltage signals $V_A$ and $V_B$ to the comparison circuit 2, and the second comparison circuit compares the voltage signals $V_A$ and $V_B$ based on the detected voltage signals $V_A$ and $V_B$ to obtain voltage signals inputA and inputB (the protection signal).

Obtaining the protection signal according to the comparison result of the first voltage and the second voltage includes: the protection signal includes a voltage signal inputA and a voltage signal inputB; when the voltage signal $V_A$ is greater than the voltage signal $V_B$, inputA is a high-level signal and inputB is a low-level signal; when the voltage signal $V_A$ is less than the voltage signal $V_B$, inputA is a low-level signal and inputB is a high-level signal.

The second signal processing unit 50 (an interlocking circuit in this example) is configured to obtain the second driving signal (signals inputA and inputB) according to the first driving signal and the protection signal. A logic "AND" operation processing is performed on the $V_{left}$ and $V_{right}$ with the protection signals inputA and inputB respectively through the interlocking circuit to generate signals outputA and outputB.

The driving unit 60 (a driving circuit in this example) is configured to drive all the rectifiers in the synchronous rectifier unit 70 according to the second driving signal. The signal $V_{left}$, after being transformed, finally corresponds to driving voltage signals $V_g$ (SR1, SR4) between the base electrodes and the source electrodes of the synchronous rectifiers SR1 and SR4, that is, the signal outputA is transformed to obtain $V_g$ (SR1, SR4) which are used to drive the synchronous rectifiers SR1 and SR4; the signal $V_{right}$, after being transformed, finally corresponds to driving voltage signals $V_g$ (SR2, SR3) between the base electrodes and the source electrodes of the synchronous rectifiers SR2 and SR3, that is, the signal outputB is transformed to obtain $V_g$ (SR2, SR3), which are used to drive the synchronous rectifiers SR2 and SR3.

APPLICATION EXAMPLE 2

Figure 3B:
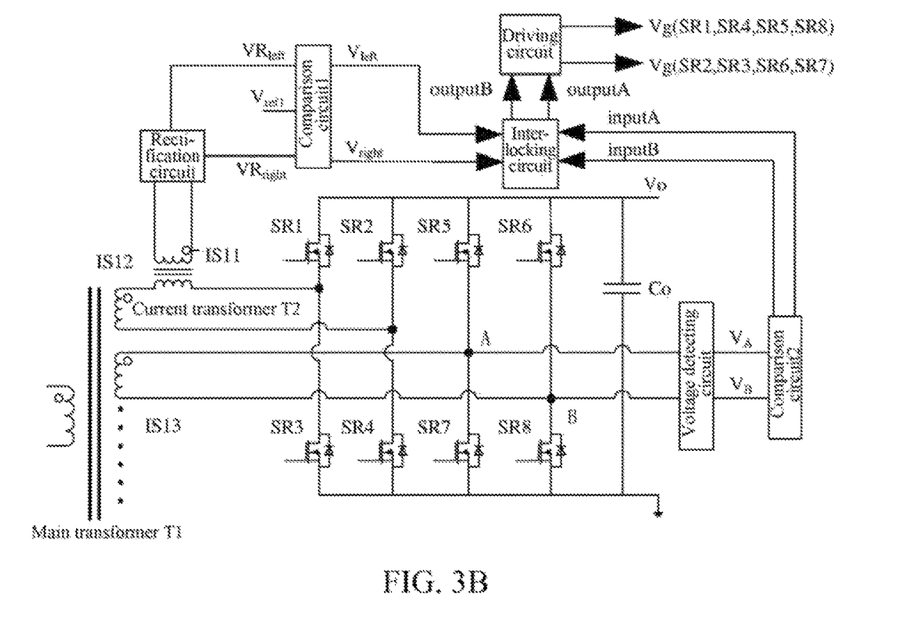

Referring to FIG. 3B, based on the concept same as or similar to that of the synchronous rectifier circuit provided in the foregoing embodiment, this example provides a synchronous rectifier circuit. In connection with FIG. 3B, in the synchronous rectifier circuit, the transformer unit 10 includes a transformer T1; each transformer includes two secondary windings IS12 and IS13 which are connected in parallel, and each secondary winding is respectively connected to a full-bridge synchronous rectifier circuit. The synchronous rectifier unit 70 includes eight synchronous rectifiers which respectively are SR1, SR2, SR3, SR4, SR5, SR6, SR7 and SR8, where SR1 and SR3 are on the same bridge arm, SR2 and SR4 are on the same bridge arm, SR5 and SR6 are on the same bridge arm, and SR7 and SR8 are on the same bridge arm.

The current sampling unit 20 includes a first instrument transformer (the current transformer T2 in this example) and a rectification circuit; a primary side of the current transformer T2 is connected in series to a secondary winding IS12 of the transformer T1, and a secondary side of the current transformer T2 is connected to the rectification circuit. The current transformer T2 is connected in series with the secondary winding IS12 of the transformer T1 and then connected to a source electrode of the full-bridge synchronous rectifier SR1, and two ends of the secondary side of the current transformer T2 are connected with the rectification circuit. The rectification circuit generates voltage signals $VR_{left}$ and $VR_{right}$ according to a current signal output by the first instrument transformer T2.

A reference voltage $V_{ref1}$ is set in the first comparison circuit (the comparison circuit 1 in this example) and the first comparison circuit obtains the voltage signal $V_{left}$ by comparing the voltage signal $VR_{left}$ with the reference voltage $V_{ref1}$ and obtains the voltage signal $V_{right}$ by comparing the voltage signal $VR_{right}$ with the reference voltage $V_{ref1}$. The voltage signals $V_{left}$ and $V_{right}$ are both square signals.

The protection unit 40 includes a voltage detecting circuit and a second comparison circuit (the comparison circuit 2 in this example), the protection signal includes voltage signals inputA and inputB. Input ends of the voltage detecting circuit are respectively connected to two ends of the secondary winding IS13. The voltage detecting circuit respectively detects the voltage to earth of a source electrode point A of the synchronous rectifier SR5 and the voltage to earth of a drain electrode point B of the synchronous rectifier SR8 to obtain voltage signals $V_A$ and $V_B$. The voltage detecting circuit provides the detected voltage signals $V_A$ and $V_B$ to the comparison circuit 2, and the second comparison circuit compares the voltage signals $V_A$ and $V_B$ based on the detected voltage signals $V_A$ and $V_B$ to obtain a protection signal (voltage signal inputA and voltage signal inputB).

In this example, the signal $V_{left}$, after circuit transformation is performed, finally corresponds to driving voltage signals $V_g$ (SR1, SR4, SR5, SR8) between the base electrodes and the source electrodes of the synchronous rectifiers SR1, SR4, SR5, SR8; the signal $V_{right}$, after circuit transformation is performed, finally corresponds to driving voltage signals $V_g$ (SR2, SR3, SR6, SR7) between the base electrodes and the source electrodes of the synchronous rectifiers SR2, SR3, SR6, SR7.

In this example, the current transformer and the secondary winding IS12 are connected in series, and the voltage detecting circuit and the secondary winding IS13 are connected in parallel. In addition, it also can be implemented by arranging the current transformer and the voltage detecting circuit in the same full-bridge synchronous rectifier circuit, that is, both the current transformer and the voltage detecting circuit are connected to the same secondary winding IS12, or both the current transformer and the voltage detecting circuit are connected to the same secondary winding IS13.

APPLICATION EXAMPLE 3

Figure 3C:
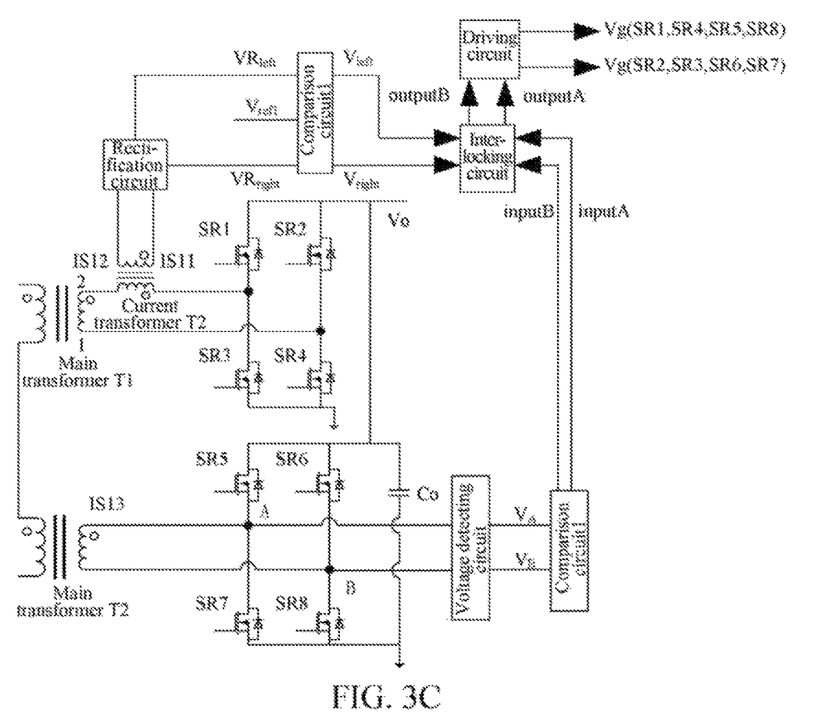

Referring to FIG. 3C, based on the concept same as or similar to that of the synchronous rectifier circuit provided in the foregoing embodiment, this example provides a synchronous rectifier circuit. In connection with FIG. 3C, in the synchronous rectifier circuit, the transformer unit 10 includes transformers T1 and T2 and the primary windings of the transformers T1 and T2 are connected in series; each transformer includes one secondary winding, the secondary winding corresponding to the transformer T1 is secondary winding IS12, the secondary winding corresponding to the transformer T2 is secondary winding IS13, and each secondary winding is respectively connected to a full-bridge synchronous rectifier circuit. The synchronous rectifier unit 70 includes eight synchronous rectifiers which respectively are SR1, SR2, SR3, SR4, SR5, SR6, SR7 and SR8, where SR1 and SR3 are on the same bridge arm, SR2 and SR4 are on the same bridge arm, and a synchronous rectifier unit 70 consisting of SR1, SR2, SR3, SR4 is connected to the secondary winding IS12; SR5 and SR6 are on the same bridge arm, SR7 and SR8 are on the same bridge arm, and a synchronous rectifier unit 70 consisting of SR5, SR6, SR7, SR8 is connected to the secondary winding IS13.

The current sampling unit 20 includes a first instrument transformer (the current transformer T2 in this example) and a rectification circuit; a primary side of the current transformer T2 is connected in series to a secondary winding IS12 of the transformer T1, and a secondary side of the current transformer T2 is connected to the rectification circuit. The current transformer T2 is connected in series with the secondary winding IS12 of the transformer T1 and then connected to a source electrode of the full-bridge synchronous rectifier SR1, and two ends of the secondary side of the current transformer T2 are connected with the rectification circuit. The rectification circuit generates voltage signals $VR_{left}$ and $VR_{right}$ according to a current signal output by the first instrument transformer T2.

A reference voltage $V_{ref1}$ is set in the first comparison circuit (the comparison circuit 1 in this example) and the first comparison circuit obtains the voltage signal $V_{left}$ by comparing the voltage signal $VR_{left}$ with the reference voltage $V_{ref1}$ and obtains the voltage signal $V_{right}$ by comparing the voltage signal $VR_{right}$ with the reference voltage $V_{ref1}$. The voltage signals $V_{left}$ and $V_{right}$ are both square signals.

The protection unit 40 includes a voltage detecting circuit and a second comparison circuit (the comparison circuit 2 in this example), the protection signal includes voltage signals inputA and inputB. Input ends of the voltage detecting circuit are respectively connected to two ends of the secondary winding IS13. The voltage detecting circuit respectively detects the voltage to earth of a source electrode point A of the synchronous rectifier SR5 and the voltage to earth of a drain electrode point B of the synchronous rectifier SR8 to obtain voltage signals $V_A$ and $V_B$. The voltage detecting circuit provides the detected voltage signals $V_A$ and $V_B$ to the comparison circuit 2, and the second comparison circuit compares the voltage signals $V_A$ and $V_B$ based on the detected voltage signals $V_A$ and $V_B$ to obtain voltage signals inputA and inputB (the protection signal).

In this example, the signal $V_{left}$, after circuit transformation is performed, finally corresponds to driving voltage signals $V_g$ (SR1, SR4, SR5, SR8) between the base electrodes and the source electrodes of the synchronous rectifiers SR1, SR4, SR5, SR8; the signal $V_{right}$, after circuit transformation is performed, finally corresponds to driving voltage signals $V_g$ (SR2, SR3, SR6, SR7) between the base electrodes and the source electrodes of the synchronous rectifiers SR2, SR3, SR6, SR7.

By using two transformers T1 and T2 connected in series, in the case of achieving the same power output, with respect to the structure of the synchronous rectifier circuit in FIG. 3A, in this example, the power undertaken by a single transformer becomes smaller, so the selection of the transformer type is more flexible. Meanwhile, with respect to the synchronous rectifier unit 70 shown in FIG. 1, in this example, synchronous rectification is implemented through eight synchronous rectifiers, the power of a single synchronous rectifier is reduced, the efficiency is higher, and the selection of the transformer type is more flexible. Based on the above factors, the efficiency of the synchronous rectifier circuit becomes high.

In this example, the current transformer and the secondary winding IS12 are connected in series, and the voltage detecting circuit and the secondary winding IS13 are connected in parallel. In addition, it also can be implemented by arranging the current transformer and the voltage detecting circuit in the same full-bridge synchronous rectifier circuit, that is, both the current transformer and the voltage detecting circuit are connected to the same secondary winding IS12, or both the current transformer and the voltage detecting circuit are connected to the same secondary winding IS13.

APPLICATION EXAMPLE 4

Figure 3D:
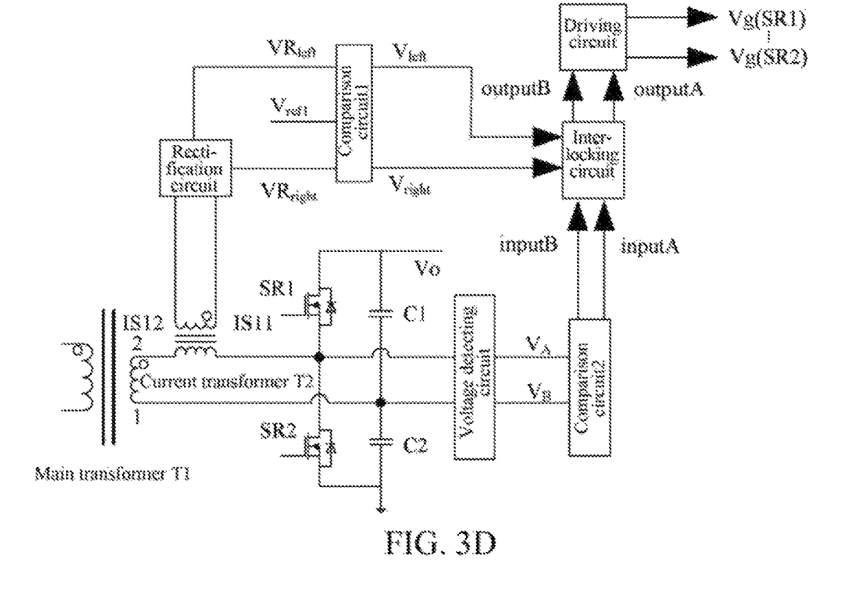

Referring to FIG. 3D, based on the concept same as or similar to the concept of the synchronous rectifier circuit provided in the foregoing embodiment, this example provides a synchronous rectifier circuit. The difference between the synchronous rectifier circuit provided in this example and the synchronous rectifier circuit shown in FIG. 3A lies in that the synchronous rectifier circuit provided in this example is a full-wave double-voltage synchronous rectifier circuit.

As shown in FIG. 3D, in the synchronous rectifier circuit, the transformer unit 10 includes a transformer T1; the transformer T1 includes a secondary winding, the synchronous rectifier unit 70 includes two rectifiers SR1 and SR2 and two capacitors C1 and C2.

The current sampling unit 20 includes a first instrument transformer (the current transformer T2 in this example) and a rectification circuit; a primary side of the current transformer T2 is connected in series to a secondary winding of the transformer T1, and a secondary side of the current transformer T2 is connected to the rectification circuit. The current transformer T2 is connected in series with the secondary winding of the transformer T1 and then connected to a source electrode of the full-bridge synchronous rectifier SR1; a current detected by the primary side of the current transformer T2 is an alternating current signal, and two ends of the secondary side of the current transformer T2 are connected with the rectification circuit. The rectification circuit generates voltage signals $VR_{left}$ and $VR_{right}$ according to a current signal output by the first instrument transformer T2.

The protection unit 40 includes a voltage detecting circuit and a second comparison circuit (the comparison circuit 2 in this example), the protection signal includes voltage signals inputA and inputB. Input ends of the voltage detecting circuit are respectively connected to two ends of the second secondary winding. The voltage detecting circuit respectively detects the voltage to earth of a source electrode A of the synchronous rectifier SR1 and the voltages of two ends of the capacitor C2 to obtain voltage signals $V_A$ and $V_B$, the voltage detecting circuit provides the detected voltage signals $V_A$ and $V_B$ to the comparison circuit 2, and the second comparison circuit compares the voltage signals $V_A$ and $V_B$ based on the detected voltage signals $V_A$ and $V_B$ to obtain voltage signals inputA and inputB (the protection signal).

The driving unit 60 (the driving circuit in this example) is configured to drive all the rectifiers in the synchronous rectifier unit 70 according to the second driving signal. The signal $V_{left}$, after being transformed, finally corresponds to a driving voltage signal $V_g$ (SR1) between the base electrode and the source electrode of the synchronous rectifier SR1, that is, the signal outputA is transformed to obtain $V_g$ (SR1) which is used to drive the synchronous rectifier SR1. The signal $V_{right}$, after being transformed, finally corresponds to driving voltage signals $V_g$ (SR2, SR3) between the base electrodes and the source electrodes of the synchronous rectifiers SR2 and SR3, that is, the signal outputB is transformed to obtain $V_g$ (SR2) which is used to drive the synchronous rectifier SR2.

APPLICATION EXAMPLE 5

Figure 3E:
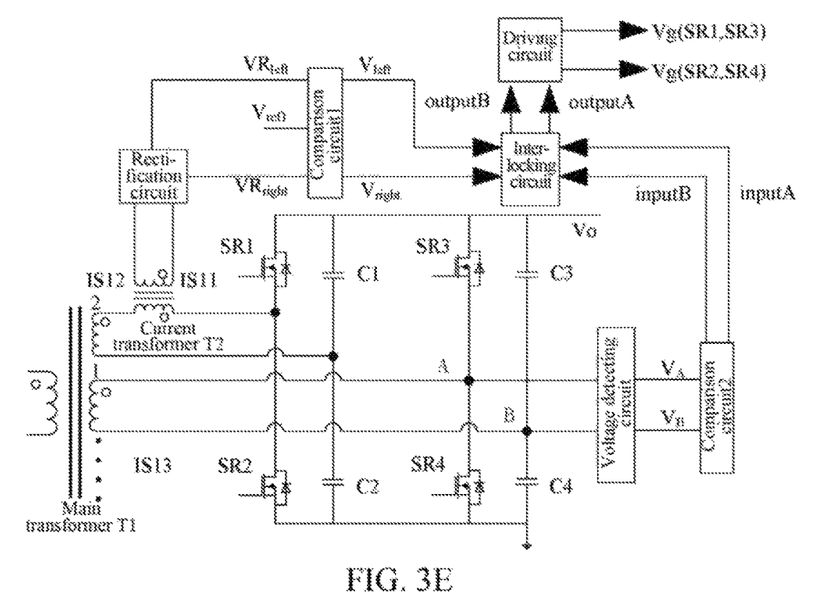

Referring to FIG. 3E, based on the concept same as or similar to the concept of the synchronous rectifier circuit provided in the foregoing embodiment, this example provides a synchronous rectifier circuit. The difference between the synchronous rectifier circuit provided in this example and the synchronous rectifier circuit shown in FIG. 3D lies in that, in the synchronous rectifier circuit provided in this example, the secondary side of a main transformer T1 is connected with two upper windings which are connected in parallel, and each secondary winding is respectively connected with a full-wave double-voltage synchronous rectifier circuit.

As shown in FIG. 3E, the current sampling device, i.e., the current transformer T2 are connected to the first full-wave double-voltage synchronous rectifier circuit, and the voltage detecting circuit detects the voltage of two ends of the secondary winding of the second full-wave double-voltage synchronous rectifier circuit.

In this example, the signal Vleft, after circuit transformation is performed, finally corresponds to driving voltage signals $V_g$ (SR1,SR3) between the base electrodes and the source electrodes of the synchronous rectifiers SR1 and SR3; the signal $V_{right}$, after circuit transformation is performed, finally corresponds to driving voltage signals $V_g$ (SR2, SR4) between the base electrodes and the source electrodes of the synchronous rectifiers SR2 and SR4.

In this example, it also can be implemented by arranging the current transformer and the voltage detecting circuit in the same full-wave double-voltage synchronous rectifier circuit.

In this example, the secondary side of the main transformer T1 may also be connected with more than two secondary windings which are all connected in parallel. Each secondary winding is connected with a full-wave double-voltage synchronous rectifier circuit, the current sampling and voltage detection may be in the same full-wave double-voltage synchronous rectifier circuit and may also be located in two full-wave double-voltage synchronous rectifier circuit separately.

APPLICATION EXAMPLE 6

Figure 3F:
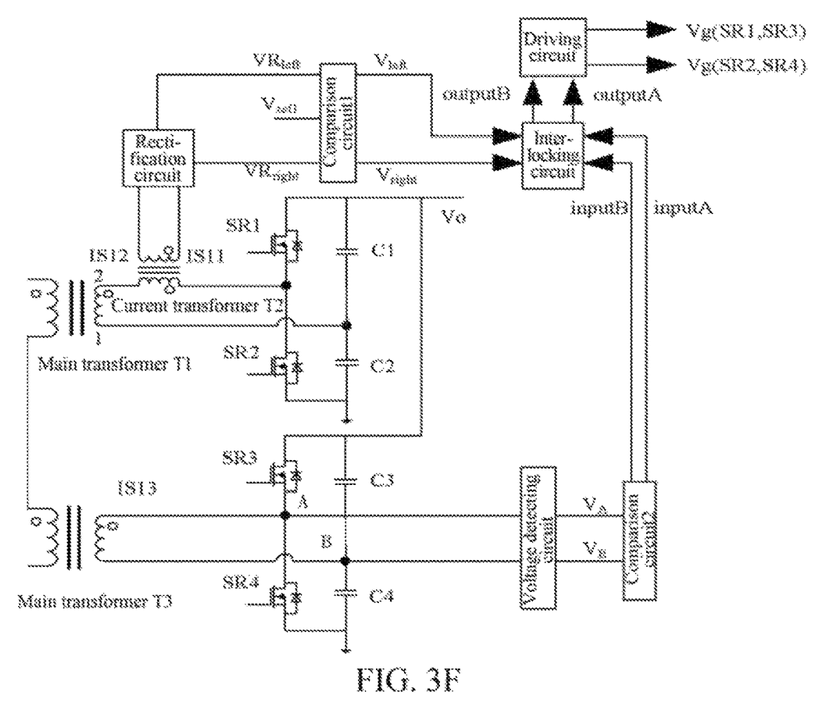

Referring to FIG. 3F, based on the concept same as or similar to the concept of the synchronous rectifier circuit provided in the foregoing embodiment, this example provides a synchronous rectifier circuit. The difference between the synchronous rectifier circuit provided in this example and the synchronous rectifier circuit shown in FIG. 3D lies in that the synchronous rectifier circuit provided in this example has two main transformers T1 and T3, the secondary side of each of the two main transformers is connected with a full-wave double-voltage synchronous rectifier circuit and the primary windings of the two main transformers are connected in series.

As shown in FIG. 3F, the current sampling device, i.e., the current transformer T2, is connected to the first full-wave double-voltage synchronous rectifier circuit, and the voltage detecting circuit detects the voltages to earth of two ends of the secondary winding of the second full-wave double-voltage synchronous rectifier circuit.

In this example, the signal $V_{left}$, after circuit transformation is performed, finally corresponds to driving voltage signals $V_g$ (SR1,SR3) between the base electrodes and the source electrodes of the synchronous rectifiers SR1 and SR3. The signal $V_{right}$, after circuit transformation is performed, finally corresponds to driving voltage signals $V_g$ (SR2, SR4) between the base electrodes and the source electrodes of the synchronous rectifiers SR2 and SR4.

In this example, it also can be implemented by arranging the current transformer and the voltage detecting circuit in the same full-bridge rectification circuit.

In this example, the current sampling device in the current sampling unit 20 is a current transformer, and the current signal of the secondary winding may also be detected in other ways. For example, by connecting a resistor in series with the secondary winding, the current signal of secondary winding can be detected.

In this example, the number of transformers in the transformer unit 10 may also be two or more. The primary windings of these main transformers are connected in series. The secondary winding of each main transformer is respectively connected to a full-wave double-voltage synchronous rectifier circuit. The current sampling unit 20 and the voltage detecting circuit can be arranged in the same full-bridge synchronous rectifier circuit and may also be arranged in two different full-bridge synchronous rectifier circuits separately.

APPLICATION EXAMPLE 7

Figure 4A:
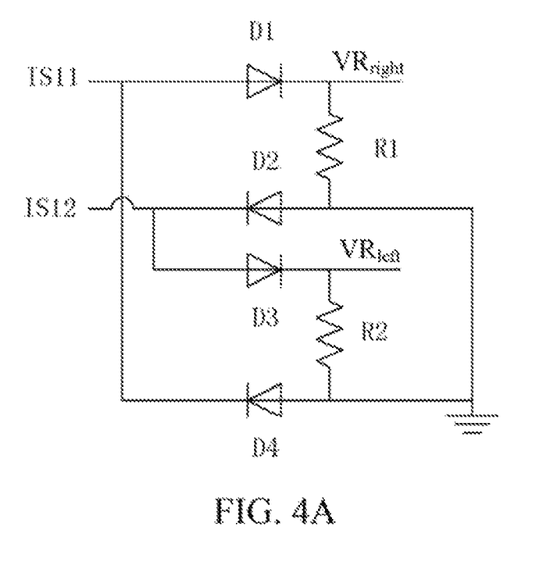
FIG. 4A is a circuit structure diagram of a rectification circuit provided in an application example of the present disclosure.

Reference is made to FIG. 4A which is a circuit structure diagram of a rectification circuit provided in this example. As shown in FIG. 4A, the secondary IS11 terminal of the current transformer T2 is simultaneously connected with an anode of a rectifier diode D1 and a cathode of a rectifier diode D4, the secondary IS12 terminal of the current transformer T2 is simultaneously connected to the cathode of the rectifier diode D2 and the anode of the rectifier diode D3, a sensing resistor R1 is connected between the cathode of the diode D1 and the anode of the diode D2, a sensing resistor R2 is connected between the cathode of the diode D3 and the anode of the diode D4, the anodes of the diodes D2 and D4 are simultaneously connected to the ground signal, the signal $VR_{right}$ is generated between the cathode of the diode D1 and the ground, and the signal $VR_{left}$ is generated between the cathode of the diode D3 and the ground.

APPLICATION EXAMPLE 8

Figure 4B:
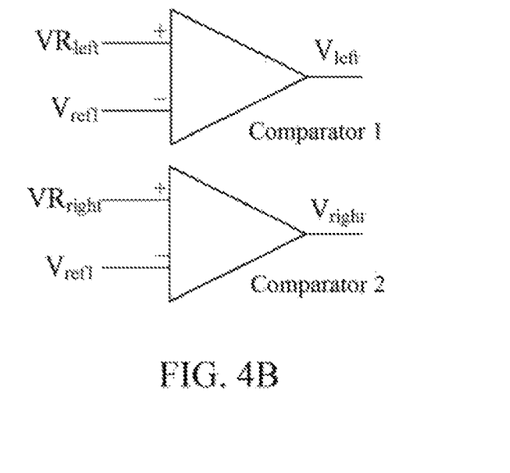
FIG. 4B is a circuit structure diagram of a first comparison circuit provided in an application example of the present disclosure.

Reference is made to FIG. 4B which is a circuit structure diagram of a first comparison circuit provided in this example. As shown in FIG. 4B, the signal $VR_{left}$ is connected to the input "+" terminal of the comparison 1, and the signal $VR_{right}$ is connected to the input input "+" terminal of the comparison 2; the signal $V_{ref1}$ is connected to the "−"

terminals of the comparison 1 and the comparison 2 at the same time; the output signal of the comparison 1 is the signal $V_{left}$ and the output signal of the comparison 2 is the signal $V_{right}$.

APPLICATION EXAMPLE 9

Figure 4C:
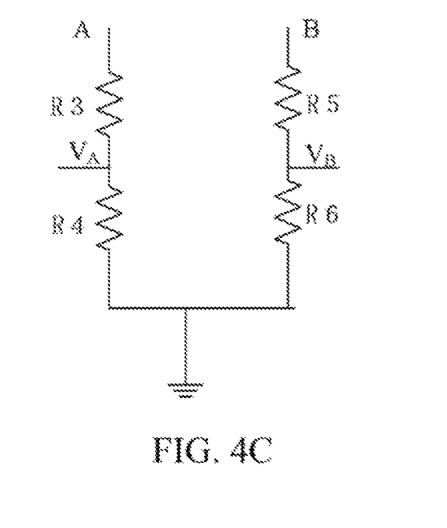
FIG. 4C is a circuit structure diagram of a voltage detecting circuit provided in an application example of the present disclosure.

Reference is made to FIG. 4C which is a circuit structure diagram of a voltage detecting circuit provided in this example. As shown in FIG. 4C, the sensing resistors R3 and R4 are connected in series and then are connected between the point A and the ground signal; the sensing resistors R5 and R6 are connected in series and then are connected between the point B and the ground signal; the signal $V_A$ is generated at the connection point of the sensing resistors R3 and R4 and the signal $V_B$ is generated at the connection point of the sensing resistors R5 and R6.

APPLICATION EXAMPLE 10

Figure 4D:
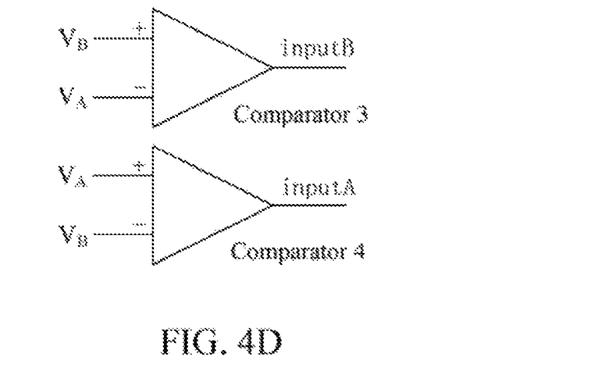
FIG. 4D is a circuit structure diagram of a second comparison circuit provided in an application example of the present disclosure.

Reference is made to FIG. 4D which is a circuit structure diagram of a second comparison circuit provided in this example. As shown in FIG. 4D, the signal $V_A$ is connected to the input "−" terminal of the comparison 1 and the input "+" terminal of the comparison 2 at the same time, and the signal $V_B$ is connected to the input "+" terminal of the comparison 1 and the input "−" terminal of the comparison 2 at the same time, herein the output terminal signal of the comparison 1 is inputB and the output terminal signal of the comparison is inputA.

APPLICATION EXAMPLE 11

Figure 4E:
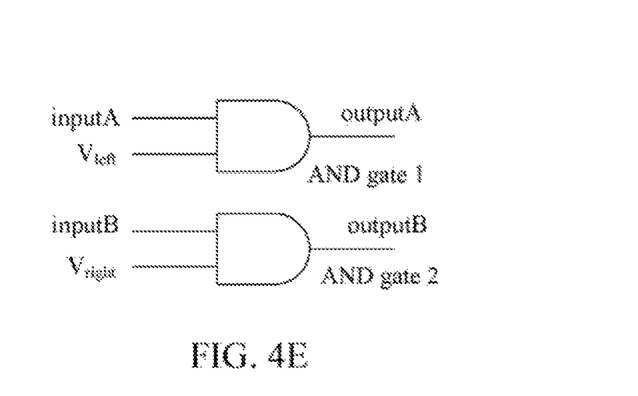
FIG. 4E is a circuit structure diagram of an interlocking circuit provided in an application example of the present disclosure.

Reference is made to FIG. 4E which is a circuit structure diagram of an interlocking circuit provided in this example. As shown in FIG. 4E, the interlocking circuit includes two AND gates, the signal inputA and the signal $V_{right}$ are respectively connected to two input ends of the AND gate 1, the signal inputB and signal $V_{left}$ are respectively connected to two input ends of AND gate 2, the output signal of the AND gate 1 is outputA, and the output signal of the AND gate 2 is outputB.

Figure 5:
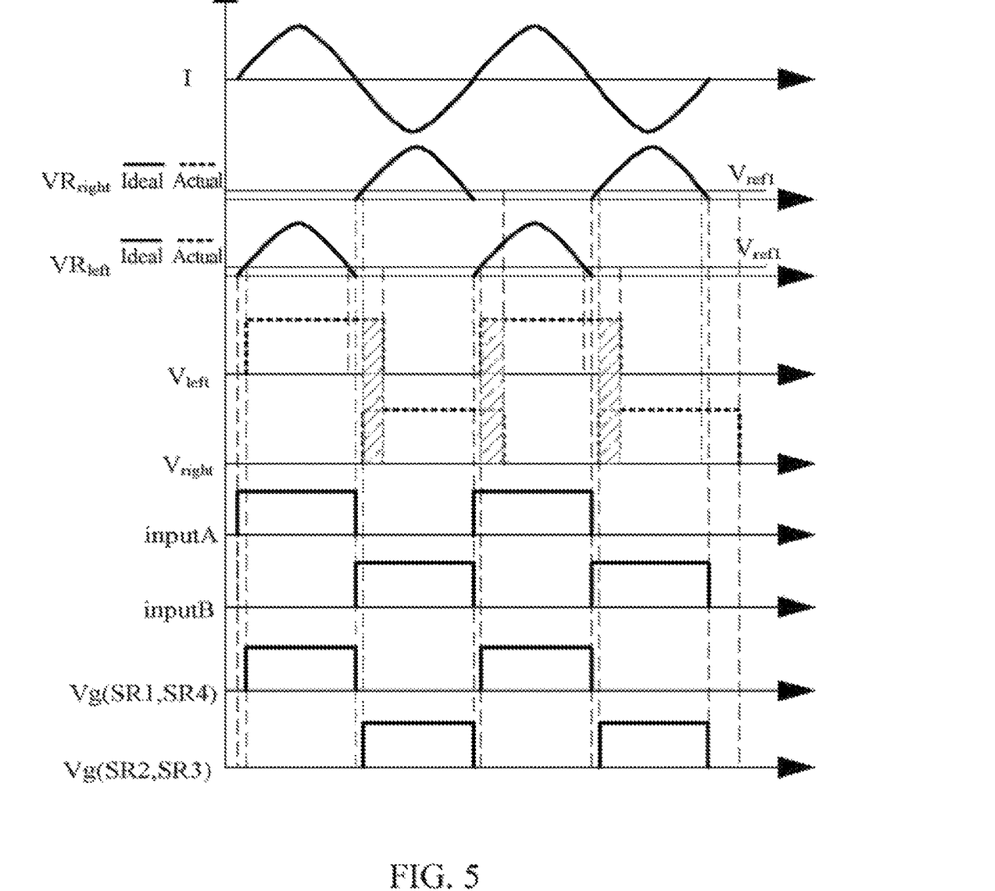
FIG. 5 is a schematic diagram of the comparison of multiple signals in the synchronous rectifier circuit.

With reference to the synchronous rectifier circuit shown in FIG. 3A, the working process of the circuit is analyzed hereinafter by taking one sinusoidal current cycle of a secondary current of the main transformer T1 as an example. Reference is made to FIG. 5 which is a schematic diagram of the comparison of multiple signals in the synchronous rectifier circuit. As shown in FIG. 5, when the secondary current I of the main transformer flows from a secondary dotted terminal and the current I increases from zero in a positive half cycle, if the output voltage $VR_{left}$ of the rectification circuit is lower than the reference voltage $V_{ref1}$, the signal $V_{left}$ is a low-level signal, the synchronous rectifiers SR1 and SR4 have no driving voltage, and the current I flows through the internal parasitic diodes of SR1 and SR4. When the current I increases to a certain value, if the output voltage $VR_{left}$ of the rectification circuit is higher than the reference voltage $V_{ref1}$, and the signal $V_{left}$ is a high-level signal, and at this moment, the high-level signal drives the synchronous rectifiers SR1 and SR4 through the driving circuit to be turned on. When the current signal I is gradually reduced to zero, if the output voltage $VR_{left}$ of the rectification circuit is lower than the reference voltage $V_{ref1}$, the signal $V_{left}$ is a low-level signal and the synchronous rectifiers SR1 and SR4 are turned off.

When the current I of the main transformer is changed from the positive half cycle to a negative half cycle, if the output voltage $VR_{right}$ of the rectification circuit is lower than the reference voltage $V_{ref1}$, the signal $V_{right}$ is a low-level signal, the synchronous rectifiers SR2 and SR3 have no driving voltage, and the current I flows through the internal parasitic diodes of SR2 and SR3. When the current I increases to a certain value, if the output voltage $VR_{right}$ of the rectification circuit is higher than the reference voltage $V_{ref1}$, and the signal $V_{right}$ becomes a high-level signal, and at this moment, the high-level signal drives the synchronous rectifiers SR2 and SR3 through the driving circuit to be turned on. When the current signal I is gradually reduced to zero, if the output voltage $VR_{right}$ of the rectification circuit is lower than the reference voltage $V_{ref1}$, the signal $V_{right}$ is a low-level signal and the synchronous rectifiers SR2 and SR3 are turned off.

However, due to the delay phenomenon in the signal processing circuit 1, the output signals $V_{left}$ and $V_{right}$ of the comparison 1 and the comparison 2 also have a delay when the primary current of the current transformer has dropped to zero, as shown by dotted lines in the signals $V_{left}$ and $V_{right}$ in FIG. 5. If the delay signals in $V_{left}$ and $V_{right}$ are left unprocessed, the synchronous rectifiers SR1 and SR3, or SR2 and SR4, on the same bridge arm will be turned on at the same time to cause a direct-conduction phenomenon, which can cause damage to the synchronous rectifiers.

In an embodiment of the present disclosure, the voltages to earth at point A and point B, $V_A$ and $V_B$, in the figure are detected by using the voltage detecting circuit. When the secondary current I of the transformer is positive (the current flows out from the secondary dotted terminal of the transformer), the voltage to earth at point A, $V_A$, is higher than the voltage to earth at point B, $V_B$, the output inputB of the comparison 3 is low-level and the output inputA of the comparison 4 is high-level. When the current is changed from the positive half to a negative half cycle, the voltage to earth at point A, $V_A$, is lower than the voltage to earth at point B, $V_B$, and when the output inputB of the comparison 3 changes from a low level to a high level, the output inputA of comparison 4 changes from a high level to a low level. Due to no delay in the secondary current of the transformer, signals inputA and inputB will flip accurately following zero-crossing of the primary current of the transformer (the waveforms are shown in FIG. 5).

In the interlocking circuit, an "AND" operation is carried out on inputA and inputB with $V_{left}$ and $V_{right}$ respectively. Since inputA and inputB are accurate without delay, although $V_{left}$ and $V_{right}$ are at a high level at the same time due to delay of $V_{left}$ and $V_{right}$, as shown by the shaded areas in FIG. 5, after the "AND" operation is carried out on inputA and inputB with $V_{left}$ and $V_{right}$ respectively, the output signals outputA and outputB will not be at a high level at the same time as what happens in the related art. In this case, the signal outputA is used to drive the synchronous rectifiers SR1 and SR4 to be conducted and the signal outputB is used to drive synchronous rectifier SR2 and SR3 to be conducted, and therefore two switching tubes on the same bridge arm would not be conducted at the same time, thus avoiding the damage to the synchronous rectifiers.

Based on a concept same as or similar to the concepts in the foregoing embodiments, an embodiment of the present disclosure further provides a switching power supply, including any of the synchronous rectifier circuits provided by the foregoing embodiments.

INDUSTRIAL APPLICABILITY

In the embodiments of the present disclosure, since the synchronous reversal can occur in the protection signal according to the level reversal of the primary winding of the transformer unit, the second driving signal is obtained by correcting the first driving signal by using the protection signal, the high level of the first driving signal is eliminated in a delay region, thus eliminating the delay phenomenon of level reversal in the first driving signal, avoiding a misoperation of turning on the synchronous rectifier, thereby reducing damage to the synchronous rectifier, improving the performance of the synchronous rectifier circuit, and improving the performance of the switching power supply including the synchronous rectifier circuit.

What we claim is:

1. A synchronous rectifier driving method, used for driving a rectifier in a synchronous rectifier circuit, wherein the synchronous rectifier driving method comprises: detecting an output current in a secondary winding of a transformer unit, and generating a first driving signal according to the output current, wherein the method comprises:
   obtaining a protection signal according to a voltage signal of the secondary winding of the transformer unit in a synchronous rectifier circuit;
   correcting the first driving signal by using the obtained protection signal to obtain a second driving signal; and
   driving a rectifier in the synchronous rectifier circuit according to the second driving signal; wherein said obtaining a protection signal according to a voltage signal of the secondary winding of the transformer unit comprises:
   detecting a first voltage and a second voltage at two ends of the secondary winding of the transformer unit and obtaining the protection signal according to a comparison result of the first voltage and the second voltage.

2. The synchronous rectifier driving method according to claim 1, wherein the protection signal includes a first voltage signal inputA and a second voltage signal inputB,
   said obtaining the protection signal according to a comparison result of the first voltage and the second voltage comprises: when the first voltage VA is greater than the second voltage VB, the first voltage signal inputA is a high-level signal and the second voltage signal inputB is a low-level signal; when the first voltage VA is less than the second voltage VB, the first voltage signal inputA is a low-level signal and the second voltage signal inputB is a high-level signal.

3. The synchronous rectifier driving method according to claim 1, wherein said correcting the first driving signal by using the obtained protection signal to obtain a second driving signal comprises:
   carrying out an AND operation on the first driving signal and the protection signal, using a result of the AND operation as the second driving signal.

4. A synchronous rectifier circuit, comprising: a transformer unit, a current sampling unit, a first signal processing unit, a driving unit and a synchronous rectifier unit, wherein the current sampling unit is configured to detect an output current in a secondary winding of the transformer unit; the first signal processing unit is configured to generate a first driving signal according to the output current in the secondary winding of the transformer unit; wherein the synchronous rectifier circuit further comprises a protection unit and a second signal processing unit;
   the protection unit is configured to obtain a protection signal according to a voltage signal of the secondary winding of the transformer unit in the synchronous rectifier circuit;
   the second signal processing unit is configured to correct the first driving signal by using the obtained protection signal to obtain a second driving signal; and
   the driving unit is configured to drive a rectifier in the synchronous rectifier circuit according to the second driving signal; wherein
   the transformer unit comprises one or more transformers and each transformer comprises one or more secondary windings; the current sampling unit comprises a first instrument transformer and a rectification circuit;
   a primary side of the first instrument transformer is connected in series to a first secondary winding which is one of secondary windings corresponding to any transformer; a secondary side of the first instrument transformer is connected to the rectification circuit; the rectification circuit generates a first voltage signal $VR_{left}$ and a second voltage signal $VR_{right}$ according to a current signal output by the first instrument transformer.

5. The synchronous rectifier circuit according to claim 4, wherein the first signal processing unit comprises a first comparison circuit, and the first driving signal includes a third voltage signal $V_{left}$ and a fourth voltage signal $V_{right}$;
   a reference voltage $V_{ref1}$ is set in the first comparison circuit and the first comparison circuit obtains the third voltage signal $V_{left}$ by comparing the first voltage signal $VR_{left}$ with the reference voltage $V_{ref1}$ and obtains the fourth voltage signal $V_{right}$ by comparing the second voltage signal $VR_{right}$ with the reference voltage $V_{ref1}$, wherein the third voltage signal $V_{left}$ and the fourth voltage signal $V_{right}$ are both square signals.

6. The synchronous rectifier circuit according to claim 4, wherein the protection unit comprises a voltage detecting circuit and a second comparison circuit, the protection signal includes a fifth voltage signal inputA and a sixth voltage signal inputB;
   input ends of the voltage detecting circuit are respectively connected to two ends of a second secondary winding, and detected seventh voltage signal $V_A$ and eighth voltage signal $V_B$ are provided to the second comparison circuit, wherein the second secondary winding is one of secondary windings corresponding to any transformer;
   the second comparison circuit compares the seventh voltage signal $V_A$ and the eighth voltage signal $V_B$ according to the detected seventh voltage signal $V_A$ and eighth voltage signal $V_B$ to obtain the fifth voltage signal inputA and the sixth voltage signal inputB.

7. The synchronous rectifier circuit according to claim 6, wherein the protection signal includes the fifth voltage signal inputA and the sixth voltage signal inputB;
   the second comparison circuit is configured as that: when the seventh voltage signal $V_A$ is greater than the eighth voltage signal $V_B$, the output fifth voltage signal inputA is a high-level signal and the output sixth voltage signal inputB is a low-level signal; when the seventh voltage signal $V_A$ is less than the eighth voltage signal $V_B$, the output fifth voltage signal inputA is a low-level signal and the output sixth voltage signal inputB is a high-level signal.

8. The synchronous rectifier circuit according to claim 6, wherein the second signal processing unit is configured to carry out an AND operation on the first driving signal and the protection signal, use a result of the AND operation as the second driving signal; the second driving signal includes a first driving signal outputA and a second driving signal outputB;

wherein an AND operation is carried out on the third voltage signal $V_{left}$ and the fifth voltage signal inputA to obtain the first driving signal outputA; an AND operation is carried out on the fourth voltage signal $V_{right}$ and the sixth voltage signal inputB to obtain the second driving signal outputB.

9. A switching power supply, comprising the synchronous rectifier circuit according to claim 4.

\* \* \* \* \*